US011876389B2

(12) United States Patent
Thomas et al.

(10) Patent No.: US 11,876,389 B2
(45) Date of Patent: Jan. 16, 2024

(54) ELECTRICAL ACCUMULATOR BATTERY

(71) Applicant: Commissariat à l'Énergie Atomique et aux Énergies Alternatives, Paris (FR)

(72) Inventors: Rémy Thomas, Echirolles (FR); Eric Fernandez, Saint Paul de Varces (FR); Sylvain Bacquet, Chasselay (FR); Léandro Cassarino, Talence (FR); Ghislain Despesse, Voreppe (FR); Yan Lopez, Renage (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 254 days.

(21) Appl. No.: 16/958,322

(22) PCT Filed: Dec. 24, 2018

(86) PCT No.: PCT/FR2018/053547
§ 371 (c)(1),
(2) Date: Jun. 26, 2020

(87) PCT Pub. No.: WO2019/129994
PCT Pub. Date: Jul. 4, 2019

(65) Prior Publication Data
US 2021/0066699 A1 Mar. 4, 2021

(30) Foreign Application Priority Data
Dec. 27, 2017 (FR) ...................................... 1763253

(51) Int. Cl.
H02J 7/00 (2006.01)
H01M 50/543 (2021.01)
(Continued)

(52) U.S. Cl.
CPC ....... *H02J 7/00036* (2020.01); *H01M 10/425* (2013.01); *H01M 10/441* (2013.01);
(Continued)

(58) Field of Classification Search
CPC ............. H01M 50/543; H01M 10/425; H01M 10/441; H01M 2010/4271
See application file for complete search history.

(56) References Cited

U.S. PATENT DOCUMENTS 9,592,745 B2 * 3/2017 Yang .................. H01M 10/425
2013/0253715 A1 9/2013 Cho et al.
(Continued)

FOREIGN PATENT DOCUMENTS

GB 2 537 616 A 10/2016
WO WO 2012/030455 A2 3/2012

OTHER PUBLICATIONS

International Search Report and Written Opinion for International Application No. PCT/FR2018/053547, dated Apr. 8, 2019.
(Continued)

Primary Examiner — Junpeng Chen
(74) Attorney, Agent, or Firm — Wolf, Greenfield & Sacks, P.C.

(57) ABSTRACT

A method of controlling a battery including a first control circuit and a plurality of modules arranged in series between first and second terminals, each module including, between third and fourth terminals, electric cells and switches and a second switch control circuit. The method includes the determination by the first control circuit of a first priority table associated with a battery charge operation and of a second priority table associated with a battery discharge operation, the first priority table including a first classification of the priorities of the electric cells for the charge operation and the second priority table comprising a second
(Continued)

classification of the priorities of the electric cells for the discharge operation.

8 Claims, 4 Drawing Sheets

(51) Int. Cl.
    *H01M 10/42*     (2006.01)
    *H01M 10/44*     (2006.01)

(52) U.S. Cl.
    CPC ......... *H01M 50/543* (2021.01); *H02J 7/0014* (2013.01); *H02J 7/00047* (2020.01); *H02J 7/0047* (2013.01); *H01M 2010/4271* (2013.01); *H02J 7/0024* (2013.01)

(56) References Cited

U.S. PATENT DOCUMENTS

| | | | |
|---|---|---|---|
| 2014/0210265 A1* | 7/2014 | Thorsoe | H02J 7/0036 307/23 |
| 2014/0361732 A1* | 12/2014 | Nishikawa | H02J 7/00 320/107 |
| 2015/0002102 A1* | 1/2015 | Ohashi | H02J 7/0025 320/135 |
| 2016/0082859 A1* | 3/2016 | Yang | H01M 10/425 701/22 |
| 2018/0099579 A1* | 4/2018 | Hale | B60L 58/21 |
| 2018/0278064 A1* | 9/2018 | Kikuchi | H02J 7/0021 |

OTHER PUBLICATIONS

International Preliminary Report on Patentability for International Application No. PCT/FR2018/053547, dated Jul. 9, 2020.

* cited by examiner

ELECTRICAL ACCUMULATOR BATTERY

This application is a national stage filing under 35 U.S.C. § 371 of International Patent Application Serial No. PCT/FR2018/053547, filed Dec. 24, 2018, which claims priority to French patent application FR17/63253, filed Dec. 27, 2017. The contents of these applications are incorporated herein by reference in their entireties.

BACKGROUND

The present invention concerns a battery of electric cells or accumulators, also called pack battery.

DISCUSSION OF THE RELATED ART

First, second, or third substrates have been used. Such a battery is capable of delivering a voltage having a waveform capable of varying over time by varying the connection of the cells over time via the turning on or the turning off of the switches.

FIG. 1 shows an example of such a battery 5. Battery 5 comprises N modules $E_1$ to $E_N$. Number N is an integer that may be in the range from 1 to 50. Each module comprises a positive terminal B+ and a negative terminal B− and a plurality of cells, not shown, capable of being connected to one another in series and/or in parallel via switches, not shown, between terminals B+ and B−. Modules $E_1$ to $E_N$ may be series-connected between a first terminal Neutral of battery 5 and a second terminal Phase of battery 5. An example of such a battery is described in patent application WO 2012/117110.

Battery 5 comprises a circuit BMS for controlling modules $E_1$ to $E_N$, called master control circuit hereafter. Master control circuit BMS may exchange data with each module $E_1$ to $E_N$ via a bidirectional data transmission BUS. Each module $E_1$ to $E_N$ comprises a circuit capable of controlling the switches of the module based on the control signals supplied by master control circuit BMS. This control circuit is called slave control circuit hereafter.

Each module may further comprise sensors, not shown, for example, sensors of the voltage across each cell of the module, sensors of the current supplied by each cell of the module, and/or sensors of the temperature of each cell of the module. The slave control circuit of each module $E_1$ to $E_N$ is capable of transmitting to master control circuit BMS data representative of the voltage, current, and/or temperature measurements over data transmission bus BUS. Master control circuit BMS may further comprise a sensor of the voltage between the phase and neutral terminals as well as a general current sensor and a temperature sensor.

Master control circuit BMS is capable of receiving a set point C and of selecting the cells to be connected or disconnected for each module in order to comply with the set point. Set point C may be a voltage or current set point, the cells to be connected or to be disconnected for each module then being selected to obtain the voltage and/or the current desired between terminals Phase and Neutral of battery 5. As a variant, set point C may be a set point for a number of cells to be connected in series and/or in parallel between terminals Phase and Neutral of battery 5, the cells to be connected or to be disconnected for each module then being selected to obtain the number of cells connected in series and/or in parallel between terminals Phase and Neutral of battery 5 requested by the set point. Master control circuit BMS then delivers control signals to the modules via data transmission bus BUS, based on which the slave control circuit of each module connects or disconnects the cells according to the desired configuration.

It is desirable to perform the selection of the cells to be connected/disconnected by ensuring that each cell operates in its optimal operating range according to the voltage, current, and temperature measurements supplied by the modules. In particular, it is desirable to perform a balancing of the cells, that is, to perform the cell selection so that the differences between the states of charge of the cells are permanently as small as possible, and/or so that the differences between the currents capable of being supplied by the cells are permanently as small as possible and/or so that the differences between the cell temperatures are permanently as small as possible. It is further desirable for the cell selection to take into account a possible failure of a cell so as to, for example, exclude this cell from the selection.

To perform the balancing function, master control circuit BMS may determine a classification of the cells according to priority levels, the cells holding the highest priority in the classification being those which should be selected first. The priority classification, also called priority table, is capable of varying during the battery operation, particularly due to the variation of the states of charge of the cells or due to the failure of a cell.

It is desirable for master control circuit BMS to take into account the priority classification during the determination of the cell selection and in particular to take into account the time variation of the priority classification. The priority classification may depend on the fact that the battery is in charge or in discharge mode.

For certain applications, the set point received by management circuit BMS may vary rapidly so that it may be difficult for master control circuit BMS to select the cells to be connected/disconnected to follow the set point while taking into account a modification in the priority classification.

SUMMARY

Thus, an object of an embodiment is to provide a battery which overcomes at least some of the disadvantages of the previously-described batteries.

Another object of an embodiment is for the transmission of the control signals from the master control circuit of the battery to the slave control circuits of the modules in order to follow the set point not to be disturbed by the modification of the priority classification.

Thus, an embodiment provides a method of controlling a battery comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the electric cells to one another and to the third and fourth terminals of the module and a second switch control circuit, the battery further comprising at least a first data transmission bus coupling the first control circuit to each second control circuit, the method comprising the determination by the first control circuit of a first priority table associated with an operation of charge of the battery and of a second priority table associated with an operation of discharge of the battery, the first priority table comprising a first classification of the priorities of the electric cells for the charge operation and the second priority table comprising a second classification of the priorities of the electric cells for the discharge operation, the method comprising the successive steps of:
- a) reception by the first control circuit of a set point; and
- b) determination of first control signals for the connection or the disconnection of at least one of the electric cells of the modules to follow said set point according to the first classification when the battery is in charge mode and according to the second classification when the battery is in discharge mode.

According to an embodiment, the set point is selected from the group comprising a set point for the delivery of a voltage between the first and second terminals, a set point for the delivery of a current to the first terminal, or a set point for the number of electric cells.

According to an embodiment, the battery comprises a memory having chained lists stored therein, each chained list comprising elements each comprising an identifier of one of the electric cells and at least a first pointer designating another element in the chained list, a first chained list among the chained lists being associated with a battery charge operation and a second chained list among the chained lists being associated with a battery discharge operation. Step b) comprises the determination of the first control signals for the connection or the disconnection of at least one of the electric cells of the modules to follow said set point based on the first chained list when the battery is in charge mode and on the second chained list when the battery is in discharge mode.

According to an embodiment, the method comprises the determination by the first control circuit, for at least a first element among the elements of one of the chained lists, of a new value of a second pointer designating a second element in the chained list or a third element in another chained list. Step b) comprises the successive steps of:
- c) determining whether the first and second pointers of said element are different; and
- d) in the case where the first and second pointers are different, replacing the first pointer with the second pointer and determining second control signals for the connection or the disconnection of the electric cell corresponding to the identifier of the first element.

According to an embodiment, step d) comprises, in the case of the connection of the electric cell corresponding to the identifier of the first element, the transmission of second control signals for the disconnection of the electric cell corresponding to the identifier of a fifth element and in the case of the disconnection of the electric cell corresponding to the identifier of the first element, the transmission of second control signals for the connection of the electric cell corresponding to the identifier of a fifth element.

According to an embodiment, the first control circuit comprises a memory having, for each electric cell, an identifier of the electric cell, a first priority level for the connection of the electric cell among priority levels for a charge operation, and a second priority level for the connection of the electric cell among the priority levels for a discharge operation, stored therein. Step b) comprises the successive steps of:
- e) transmission, by the first control circuit to the second control circuits, of first control signals for the connection or the disconnection of at least one of the electric cells of the modules to follow said set point; and
- f) transmission, by the first control circuit to the second control circuits, of second control signals for the connection of one of the electric cells and the disconnection of another electric cell among the electric cells.

According to an embodiment, the memory rows relative to the first priority levels are arranged by increasing ranks and the rows of the memory relative to the second priority levels are arranged by increasing ranks. Step f) comprises the successive steps of:
- g) inverting first and second rows of the memory if the priority level of the electric cell, among the first priority levels during a charge operation and among the second priority levels during a discharge operation, at the first row is greater than the rank of the first row; and
- h) transmission, by the first control circuit to the second control circuits, of the second control signals for the connection of the electric cell having the identifier at the second row before the exchange and for the disconnection of the electric cell having the identifier at the first row before the exchange in the case where the electric cell having the identifier at the second row before the exchange is disconnected and the electric cell having the identifier at the first row before the exchange is connected.

According to an embodiment, the first control circuit uses a first pointer designating a third row in the memory. At step a), the control circuit modifies the pointer to designate a fourth row in the memory, the number of rows between the third row and the third row, counting the fourth row, being equal to the number of cells to be connected or to be disconnected to follow the set point.

According to an embodiment, the first control circuit uses a second pointer designating a fifth row in the memory and the first control circuit modifies the second pointer to designate a sixth row in the memory adjacent to the fifth row when the priority level of the electric cell at the fifth row is equal to the rank of the fifth row.

According to an embodiment, the method comprises the transmission, by the first control circuit to the second control circuits, of first data representative of an electric cell configuration to be obtained to follow the set point, the second control circuits connecting or disconnecting the electric cells based on said first data and on a first classification of the priorities of the electric cells for a charge operation or on a second classification of the priorities of electric cells for a discharge operation. The method further comprises the steps of:
- i) determination by the first control circuit of a new version of the first and/or second priority classification;
- j) transmission, by the first control circuit to each second control circuit, of second data representative of at least a portion of the new version of the first and/or second priority classification;
- k) transmission, by each second control circuit to the first control circuit, of third data indicating the reception by the second control circuit of said at least a portion of the new version of the first and/or second priority classification; and
- l) transmission, by the first control circuit to the second control circuits, of an order to use the new version of the first and/or second priority classification.

An embodiment also provides a battery comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the electric cells to one another and to the third and fourth terminals of the module and a second switch control circuit, the battery further comprising at least one first data transmission bus coupling the first control circuit to each second control circuit, the battery comprising a memory, the first control circuit being configured to determine a first priority table associated with a battery charge operation and a second priority table associated with a battery discharge operation, the first priority table comprising a first classification of the priorities of the electric cells for the charge operation and the second priority table comprising a second classification of the priorities of the electric cells for the charge operation, the first control circuit being configured to receive a set point and the first control circuit or each second control circuit being configured to determine first control signals for the connection or the disconnection of at least one of the electric cells of the modules to follow said set point according to the first classification when the battery is in charge mode and according to the second classification when the battery is in discharge mode.

According to an embodiment, the battery comprises a second data transmission bus coupling the first control circuit to each second control circuit. The first control circuit is configured to transmit first data to the second control circuits over the first bus at a first rate and is configured to transmit second data to the second control circuits over the second bus at a second rate smaller than the first rate.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. For the sake of clarity, only the elements that are useful for an understanding of the embodiments described herein have been illustrated and described in detail. In particular, the conventional functions carried out by a master control circuit of a cell battery such as the cell balancing are well known by those skilled in the art and are not described in further detail hereafter. In the following description, the expressions "substantially", "about", "approximately", and "in the order of" mean "within 10%", preferably within 5%.

Master control circuit BMS may correspond to a dedicated circuit and/or may comprise a processor, for example, a microprocessor or a microcontroller, capable of executing instructions of a computer program stored in the memory. Master control circuit BMS particularly comprises a data storage memory MEM.

An embodiment of a method of controlling systems with switched cells will be described in the case of a switched cell battery for which the cells correspond to switched cells. However, the present embodiments apply to any type of system with switched cells capable of supplying a variable voltage to a load. Each cell of the system with switched cells may correspond to an electric charge storage element or to an electric generator. An example of an electric charge storage element for example is an electric cell or a capacitor. An example of an electric generator is for example a fuel cell, a zinc-air cell, a photovoltaic cell, or a power recovery system, particularly a small wind power plant or a miniturbine. The system which switched cells may comprise electric charge storage elements only, electric generators only, or both electric charge storage elements and electric generators. When the system with switched cells comprises electric generators only, the use is theoretically in discharge mode only. However, in case of a reactive power, for brief passages through a negative power at each period, the inertia of the generator may be sufficient to smooth the power, for example, due to the rotation inertia and to the stray capacitances. Further, each generator may be connected in parallel to a resistive element, to accept negative powers, by dissipating this power. In operation, the system is intended to be coupled to a device which absorbs or supplies power according to the envisaged application. As an example, this device corresponds to an electric machine, for example, to an electric motor, or to the electric distribution network.

Figure 2:
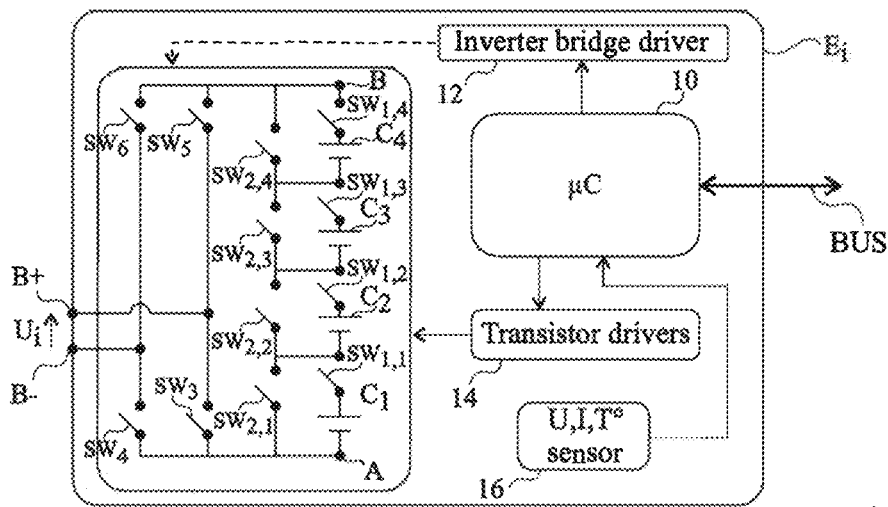
FIG. 2 partially and schematically shows an embodiment of a module of the battery of FIG. 1.

FIG. 2 shows an embodiment of module $E_i$, where i varies from 1 to N.

According to the present embodiment, module $E_i$ is capable of delivering a voltage $U_i$ between positive terminal B+ and negative terminal B−. Module $E_i$ comprises cells $C_1$ to $C_M$, where M is an integer in the range from 2 to 10, preferably from 2 to 5, four cells $C_1$, $C_2$, $C_3$, and $C_4$ being shown as an example in FIG. 2. Cells $C_1$ to $C_M$ are coupled together and to terminals B+ and B− by switches. In the present embodiment, for each cell $C_k$, k being an integer varying from 1 to M, module $E_i$ comprises a first switch $SW_{1,k}$ in series with cell $C_k$ and a second switch $SW_{2,k}$ in parallel with the assembly comprising cell $C_k$ and switch $SW_{1,k}$. The M assemblies comprising cell $C_k$ and first switch $SW_{1,k}$ are arranged in series between a node A and a node B. The control of switches $SW_{1,k}$ and $SW_{2,k}$, with k varying from 1 to M, enables to place in series between nodes A and B from 1 to M cells among the M cells $C_1$ to $C_M$. In the present embodiment, module $E_i$ further comprises an inverter bridge, also called H bridge, between nodes A and B and terminals B+ and B−, which enables to apply the voltage present between nodes A and B between terminals B+ and B− in both directions. According to an embodiment, the inverter bridge comprises a switch $SW_3$ coupling node A to terminal B+, a switch $SW_4$ coupling node A to terminal B−, a switch $SW_5$ coupling node B to terminal B+, and a switch $SW_6$ coupling node B to terminal B−. As an example, each switch $SW_{1,k}$ and $SW_{2,k}$, with k varying from 1 to M, $SW_3$, $SW_4$, $SW_5$, and $SW_6$ may correspond to an insulated field-effect transistor, also called MOS transistor, particularly a MOS power transistor, for example, an N-channel MOS transistor.

Each module $E_i$ further comprises slave control circuit 10 (μC), capable of exchanging and of receiving data transmitted by master control circuit BMS over data transmission bus BUS. Slave control circuit 10 may correspond to a dedicated circuit or may comprise a processor, for example, a microprocessor or a microcontroller, capable of executing instructions of a computer program stored in the memory.

Each module $E_i$ further comprises a driver circuit 14 (Inverter bridge driver) coupled to switches $SW_3$, $SW_4$, $SW_5$, and $SW_6$ of the inverter bridge and a driver circuit 14 (Transistors driver) coupled to switches $SW_{1,k}$ and $SW_{2,k}$, with k varying from 1 to M. Each driver circuit 14, 16 is capable of converting the control signals delivered by slave control circuit 12 into signals capable of controlling the switches.

Each module $E_i$ further comprises sensors 16 (U, I, T° sensor) coupled to slave control circuit 10. Module $E_i$ may comprise, for each cell $C_k$, a temperature sensor capable of measuring the temperature of cell $C_k$. Module $E_i$ may further comprise, for each cell $C_k$, a voltage sensor capable of measuring the voltage across cell $C_k$. Module $E_i$ may further comprise a current sensor capable of measuring the current flowing at node A or at node B. The slave control circuit 10 of each module $E_i$ is capable of transmitting third data to master control circuit BMS over data transmission bus BUS, representative of the measurements performed by the sensors 16 of module $E_i$. The number and the type of sensors particularly depend on the arrangement of the cells of module $E_i$. In the cell arrangement shown in FIG. 2, a single sensor of the current flowing at node A or at node B may be provided.

In the embodiment of a battery module $E_i$ illustrated in FIG. 2, an order of connection of a cell $C_k$ of a module $E_i$ means that cell $C_k$ should be series-connected between the nodes A and B of module $E_i$, which is obtained by turning on switch $SW_{1,k}$ and by turning off switch $SW_{2,k}$, and an order of disconnection of a cell $C_k$ of a module $E_i$ means that cell $C_k$ should not be series-connected between the nodes A and B of module $E_i$, which is obtained by turning off switch $SW_{1,k}$ and by turning on $SW_{2,k}$. However, for a different arrangement of the cells $C_k$ of module $E_i$ where cells $C_k$ may be arranged in series or in parallel between nodes A and B, an order of connection of cells $C_k$ further specifies in which configuration, series or parallel, cell $C_k$ is placed with respect to the other cells of module $E_i$.

According to another embodiment, master control circuit BMS uses two priority tables, a first priority table which is used during a charge operation, called charge priority table, and a second priority table which is used during a discharge operation, called discharge priority table. Each priority table may be stored in memory MEM of master control circuit BMS, for example, in the form of a table, each row of the table for example corresponding to a row of memory MEM. As an example, for a battery comprising N cells, an identifier, for example, a number which varies from 1 to N, is assigned to each cell. The identifiers may be the same for the two priority tables. For a battery 5 comprising N cells, each priority table comprises N rows, each row j, with j being an integer varying from 1 to N, being associated with the cell having number j. The priority level of the cell is in particular stored in each priority table for each cell. As an example, for a battery comprising N cells, the priority levels of the cells range from 1 to N, priority level "1" being the highest and priority level "N" being the lowest. Master control circuit BMS may change the priority levels of the cells of each priority table, particularly based on the data transmitted by modules $E_i$, with i varying from 1 to N, originating from the measurements of the sensors of modules $E_i$. The expression update of the priority table designates a modification of the priority levels of at least certain cells by master control circuit BMS in the priority table.

Such an embodiment advantageously enables to have the priority levels vary differently between charge operations and discharge operations. In particular, this enables the priority levels during a charge operation not to necessarily be symmetrical to the priority levels during a discharge operation, that is, the order of the cell priority levels, from the highest priority to the lowest priority, for an operation of discharge of battery 5, is not necessarily the inverse of the order of the priority levels of the cells, from the highest priority to the lowest priority, for a charge operation.

For the determination of the priority levels of the battery cells, criteria such as the state of charge, the cell temperature, the state of health of the cell, or the internal impedance of the cell may be taken into account.

For each priority table, master control circuit BMS associates, with each cell having a given priority level, a pointer, called next priority pointer hereafter, which designates the cell in the priority table which has the priority level just lower than the given priority level and a pointer, called previous priority pointer hereafter, which designates the cell in the priority table which has the priority level just higher than the given priority level.

The previous priority pointer associated with the cell having the highest priority level in the priority table designates no other cell and may comprise a reference value called Null. The next priority pointer associated with the cell having the lowest priority level in the priority table designates no other cell and may comprise a reference value called Null.

For each priority table, an update operation comprises determining new priority levels in the priority table for the cells. Master control circuit BMS further associates, with each cell, a pointer, called future previous priority pointer hereafter, which designates the cell in the priority table which has the priority level just higher than the new priority level of the cell in the update of the priority table and a pointer, called future next priority pointer hereafter, which designates the cell in the priority table which has the priority level just lower than the new priority level of the cell in the update of the priority table. According to an embodiment, the next and previous pointers and the future next and previous pointers may be stored in the priority table.

According to an embodiment, master control circuit BMS may transmit first control signals corresponding to orders for the connection/disconnection of the cells to the slave control circuits to follow set point C and may further transmit second control signals corresponding to orders for the connection/disconnection of the cells to the slave control circuits to take into account an update of the priority table.

According to an embodiment, master control circuit BMS uses chained lists to determine the orders of cell connection/disconnection to be carried out. A chained list designates in computer science a data structure representing an ordered collection of arbitrary size of elements of the same type, represented in the computer memory by a succession of elements made of content and of at least one pointer to another element. To give an image, the assembly of elements resembles a chain where the links would be the elements. All the data relative to each chained list may be stored in memory MEM of master control circuit BMS. According to an embodiment, master control circuit BMS uses first chained lists for a charge operation, which are associated with the charge priority table, and second chained lists for a discharge operation, which are associated with the discharge priority table.

Figure 3:
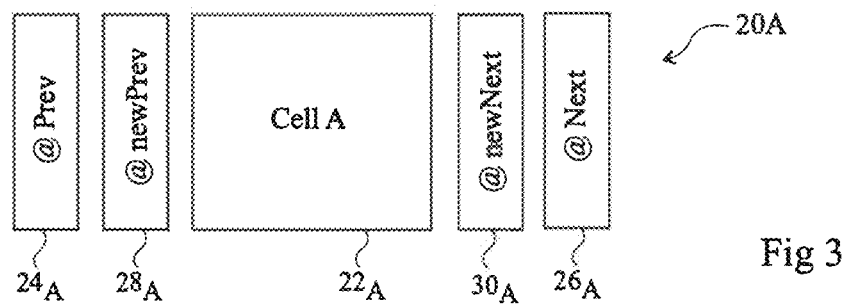
FIG. 3 schematically shows an element 20 of a chained list used during the operation of the battery shown in FIG. 1.

FIG. 3 schematically shows an element $20_A$ of the chained list. In the rest of the description of the chained lists, when reference is made to a priority table without specifying whether it is the charge priority table or the discharge priority table, this means that it is the charge priority table when the chained list is associated with a charge operation or the discharge priority table when the chained list is associated with a discharge operation.

Each element $20_A$ comprises:
- an identifier $22_A$ (Cell A) of one of the cells of battery 5, for example, the same as that used in the priority table;
- a pointer $24_A$ (@ Prev) which designates an element of the chained list corresponding to a cell having a priority level higher than that corresponding to element $20_A$ in the version of the priority table before update, and which is called previous pointer $24_A$ in the rest of the disclosure; and
- a pointer $26_A$ (@ Next) which designates an element of the chained list corresponding to a cell having a priority level lower than that corresponding to element $20_A$ in the version of the priority table before update, and which is called next pointer $26_A$ in the rest of the disclosure.

In the rest of the disclosure, it is indifferently spoken of a cell or of the associated element of a chained list.

According to an embodiment, each chained list comprises a portion only of the cells of battery 5. Two elements of two different chained lists associated with the same battery cell have the same identifier $22_A$. However, the values of the previous pointer $24_A$ and of the next pointer $26_A$ of two elements of two different chained lists associated with the same battery cell may be different. Similarly, the previous pointer $24_A$ of a cell of a chained list may be different from the previous priority pointer used for this cell in the priority table and the next pointer $26_A$ of a cell of a chained list may be different from the next priority pointer used for this cell in the priority table.

Figure 4:
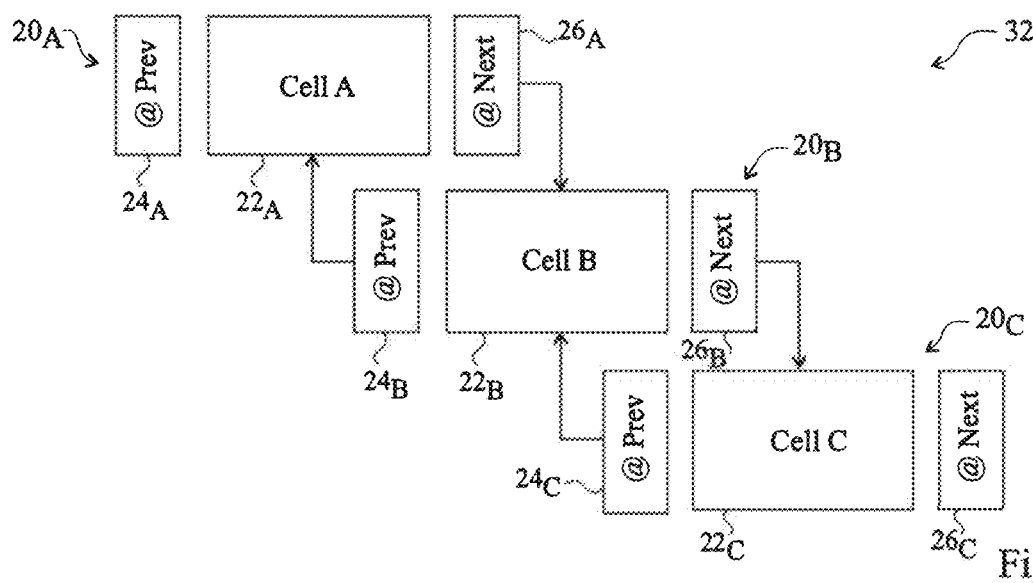
FIG. 4 partially and schematically shows an example of one of the chained lists used during the operation of the battery shown in FIG. 1.

FIG. 4 partially and schematically shows an example of a chained list 32 capable of being used by master control circuit BMS comprising, as an example, three elements $20_A$, $20_B$, and $20_C$. The next pointer $26_A$ of element $20_A$ designates element $26_B$ of the chained list and the previous pointer $24_B$ of element $26_B$ designates element $20_A$ of the chained list. The next pointer $26_B$ of element $20_B$ designates element $26_C$ of the chained list and the previous pointer $24_C$ of element $26_C$ designates element $20_B$ of the chained list. This means that, in the version before update of the priority table, the priority level of element $20_A$ is higher than the priority level of element $20_B$ and that the priority level of element $20_B$ is higher than the priority level of element $20_C$.

The chained list comprises two specific elements, the elements $20_A$ and $20_C$ located at the ends of the chained list. The previous pointer $26_A$ of element $20_A$ of the chained list does not designate an element in the chained list and comprises a reference value called Null. The next pointer $26_C$ of element $20_C$ of the chained list does not designate an element of the chained list and comprises reference value Null.

The elements of a chained list are arranged in ordered fashion from the first element of the chained list to the last element of the chained list. In the example shown in FIG. 4, the first element of chained list 32 may correspond to element $20_A$ or to element $20_B$ according to the way in which the elements are arranged in the chained list. The rank of an element in the chained list corresponds to the position of this element counted from the first element $20_A$ of the chained list.

The removal of an element from a chained list will be illustrated with the chained list 32 of FIG. 4. As an example, the removal of element $20_B$ is obtained by modifying the next pointer $26_A$ of element $20_A$ so that it designates element $20_C$ and by modifying the previous pointer $24_C$ of element $20_C$ so that it designates element $20_A$. The removal of element $20_A$ is obtained by modifying the previous pointer $24_B$ of element $20_B$ so that it designates reference value Null. The removal of element $20_C$ is obtained by modifying the next pointer $26_B$ of element $20_B$ so that it designates reference value Null.

The addition of a new element within a chained list is obtained by modifying the adapted pointers of the elements having the new element inserted therebetween so that they designate the new element and by modifying the next and previous pointers of the new element so that they designate the elements having the new element inserted therebetween. As an example, the addition of a new element, not shown, between elements $20_A$ and $20_B$ of chained list 32 is obtained by modifying the next pointer $26_A$ of element $20_A$ so that it designates the element, by modifying the previous pointer $24_B$ of element $20_B$ so that it designates the new element, by modifying the previous pointer of the new element so that it designates element $20_A$, and by modifying the next pointer of the new element so that it designates element $20_B$.

The addition of a new element at one end of a chained list will be illustrated by the addition of a new element at the end of the chained list 32 corresponding to element $20_A$. This addition is obtained by modifying the previous pointer of the element $20_A$ which was initially at the end of chained list 32 so that it designates the new element, by modifying the next pointer of the new element so that it designates the element $20_A$ which was initially at the end of chained list 32, and by modifying the next pointer of the new element so that it designates reference value Null.

Master control circuit BMS may use a plurality of chained lists. According to an embodiment, master control circuit BMS uses a chained list having its elements corresponding to the usable cells of battery 5 which are connected or disconnected during a charge operation. Such a chained list is called charge list of valid cells hereafter. The elements of the charge list of valid cells may be arranged with the first element corresponding to the cell having the highest priority level in the version before update of the charge priority table. The connected cells are then all located in the first portion of the charge list of valid cells from the first position in the charge list of valid cells and the disconnected cells are all located in the second portion of the charge list of valid cells all the way to the last position in the charge list of valid cells. Master control circuit BMS may use a position pointer which is maintained up to date to mark the position in the chained list of the last connected element having the lowest priority level. As a variation, the pointer may designate the first disconnected element having the highest priority level. Similarly, master control circuit BMS may use a chained list having its elements corresponding to the usable cells of battery 5 which are connected or disconnected during a discharge operation. Such a chained list is called discharge list of valid cells hereafter.

According to another embodiment, instead of the charge list of valid cells, master control circuit BMS uses two chained lists, one chained list having its elements corresponding to the cells of battery 5 which are connected during a charge operation, and being called charge list of connected cells hereafter, and one chained list having its elements corresponding to the cells of battery 5 which are not connected but which are capable of being connected during a charge operation, and being called list of disconnected cells hereafter. The elements of the charge list of disconnected cells may be arranged with the first element corresponding to the cell having the highest priority level in the version before update of the charge priority table among the disconnected cells. The elements of the charge list of connected cells may be arranged with the first element corresponding to the cell having the lowest priority level in the version before update of the charge priority table among the connected cells. Similarly, master control circuit BMS may use, instead of the discharge list of valid cells, a list of connected cells for a discharge operation and a list of disconnected cells for a discharge operation.

According to an embodiment, master control circuit BMS further uses at least one chained list having its elements corresponding to cells of battery 5 which are not connected and which cannot be selected. Such elements and the corresponding cells are said to be in quarantine hereafter and the chained list is called quarantine list hereafter. Master control circuit BMS is capable of determining that a battery cell should be placed in quarantine and the corresponding element should be displaced in the quarantine list particularly based on the signals delivered by the sensors of modules $E_i$, with i varying from 1 to N.

A plurality of quarantine lists may be used. According to the criteria used for the displacement of a cell into a quarantine list, the quarantine list may be common to the charge and discharge operation, may be associated with charge operations only, or may be associated with discharge operations only.

A chained list may comprise elements temporarily placed in quarantine. Such a chained list is called temporary quarantine list hereafter. Another chained list may comprise elements definitively placed in quarantine, the corresponding cells of which should be replaced. Such a chained list is called definitive quarantine list hereafter. In the previously-described quarantine lists, elements may be arranged with the first element corresponding to the cell having the highest priority level in the version before update of the priority table among the cells of the chained list. As a variant, the elements may be arranged in the quarantine list by order of arrival in the chained list.

According to another embodiment, instead of a list of cells in temporary quarantine for a charge operation and a list of cells in temporary quarantine for a discharge operation, master control circuit BMS may use more than two chained lists of elements placed in temporary quarantine according to the conditions which have resulted in discarding the corresponding cells A chained list may comprise elements temporarily placed in quarantine when at least one of the operating parameters of the corresponding cells for example, the cell temperature, the cell charge rate, the voltage across the cell, etc. is outside of a normal operating range. Such a chained list is called list of temporary quarantine due to a voltage/temperature cause hereafter. Master control circuit BMS may use a list of temporary quarantine due to a voltage/temperature cause for charge operations and a list of temporary quarantine due to a voltage/temperature cause for discharge operations.

According to an embodiment, the number of connection/disconnection operations that the slave control circuit 12 of a module $E_i$, with i varying from 1 to N, can perform per time unit may be limited due to the structure of the power supply circuits of the internals components of module $E_i$. Another chained list may comprise elements temporarily placed in quarantine because the modules containing the corresponding cells have exceeded the authorized threshold of connection/disconnection operations per time unit. Such a chained list is called list of temporary quarantine due to a power supply cause hereafter. For the list of quarantine due to a power supply cause and the definitive quarantine list, it may not be useful to provide different chained lists for the charge and discharge operations since the criteria which cause the displacement of an element into one of these lists may be the same for a charge or discharge operation.

According to an embodiment, for a charge or discharge operation, to each cell of the battery corresponds a single element in one of the selection lists used for the charge or discharge operation. It is then indifferently spoken of the cell or of the corresponding element in the rest of the disclosure. According to an embodiment, in the case where master control circuit BMS uses a list of connected cells for a charge operation, a list of connected cells for a discharge operation, a list of disconnected cells for a charge operation, a list of disconnected cells for a discharge operation, a list of temporary quarantine due to a voltage/temperature cause for a charge operation and a list of temporary quarantine due to a voltage/temperature cause for a discharge operation, and at least another common quarantine list for charge and discharge operations, each cell is in one of the following chained lists:

the list of connected cells for a charge operation, the list of disconnected cells for a discharge operation, the list of temporary quarantine due to a voltage/temperature cause for a charge operation, or another common quarantine list for charge and discharge operations;

and in one of the following lists:

list of connected cells for a discharge operation, list of disconnected cells for a discharge operation, the list of temporary quarantine due to a voltage/temperature cause for a discharge operation, or another common quarantine list for charge and discharge operations.

However, advantageously, certain combinations may be excluded. As an example, it may be provided for a cell not be able to be both in the list of connected cells for a charge operation and in the list of temporary quarantine due to a voltage/temperature cause for a discharge operation. Indeed, without this exclusion, when it is passed from a charge operation to a discharge operation, the element of the charge list of connected cells, which thus corresponds to a cell which is electrically connected, is in the list of temporary quarantine due to a voltage/temperature cause for a discharge operation, while still corresponding to a cell which is electrically connected. It would then be necessary for the transition from a charge operation to a discharge operation (or from a discharge operation to a charge operation) to apply an additional processing to the list of temporary quarantine due to a voltage/temperature cause for a discharge (or charge) operation to disconnect the cells which are still electrically connected, which implies an additional processing time. The fact of providing exclusions thus enables to ease transitions between the charge and discharge operations.

In the following description, the previously-described chained lists used by master control circuit BMS for the determination of the first and second control signals are called selection lists.

Master control circuit BMS associates with each battery cell the previous pointer of this element in the selection list to which the element belongs, the next pointer of this element in the selection list to which the element belongs, and appurtenance data enabling to directly or indirectly determine which selection list the cell belongs to. When the cell belongs to two selection lists, one associated with a charge operation and the other associated with a discharge operation, the previous pointer, the next pointer, and the appurtenance data indicated at the previous phase are associated with the cell both for the selection list associated with a charge operation and the selection list associated with a discharge operation. An advantage of the previously-described embodiment is that the management of the chained lists may implement a static memory allocation since a known maximum number of data is stored for each cell of the battery.

In the rest of the disclosure, unless otherwise indicated, it is considered for more simplicity that an element belongs to a single selection list. However, in the case where the element belongs to two selection lists, one associated with a charge operation and the other associated with a discharge operation, the steps described hereafter are to be carried out for each selection list. For the charge priority table and the discharge priority table, the update of the priority table particularly comprises the determination by master control circuit BMS, for each cell, of a new value of the cell priority level in the priority table. The update of the priority table further comprises the determination of new values for the future previous and next pointers to take into account priority level changes. To perform an update of the priority table, master control circuit BMS may use a copy of the priority table, called temporary priority table, having algorithms applied thereto to determine the new values of the priority levels and of the future pointers. When all the new values of the temporary priority table are determined, master control circuit BMS stops the use of the priority table and uses the temporary priority table. The temporary priority table then becomes the updated priority table and the priority table used up to then by master control circuit for the determination of the first and second control signals may be used as the next temporary priority table. The update of the priority table may be performed as a background task by master control circuit BMS, when the resources of master control circuit BMS are not used to implement the cell control method that will be described. According to an embodiment, when master control circuit BMS updates the charge priority table, it also updates the discharge priority table, and conversely.

According to an embodiment, in addition to the selection lists, master control circuit BMS uses at least one additional chained list containing the elements which are likely to be incorrectly placed in the selection lists. This chained list is called sorting list hereafter. An element present in the sorting list is thus always present in at least one of the selection lists.

Elements may be incorrectly placed in the selection lists for several reasons:
  elements may be incorrectly placed in the selection lists associated with a charge operation due to a change in priority levels resulting from an update of the charge priority table;
  elements may be incorrectly placed in the selection lists associated with a discharge operation due to a change in priority levels resulting from an update of the discharge priority table;
  elements may be incorrectly placed in the selection lists associated with a charge operation due to a change in priority levels resulting from an update of the discharge priority table while the battery is in discharge mode, which would cause inconsistencies when it is passed from the discharge operation to a charge operation; and
  elements may be incorrectly placed in the selection lists associated with a discharge operation due to a change in priority levels resulting from an update of the charge priority table while the battery is in charge mode, which would cause inconsistencies when it is passed from the charge operation to a discharge operation.

According to an embodiment, master control circuit BMS may use a single sorting list comprising all the elements capable of not being correctly placed for a charge or discharge operation. According to an embodiment, during the update of the charge or discharge priority table, all the elements of the priority table may be placed by default in the sorting list. This enables to be sure to process placement inconsistencies with respect to the new priority sets and with respect to the transitions between the charge and discharge operations.

According to another embodiment, master control circuit BMS may use a sorting list for a charge operation, called charge sorting list, and a sorting list for a discharge operation, called discharge sorting list. As a variant, master control circuit BMS may use a sorting list, called common sorting list, which comprises the elements to be sorted in the same way during an update of the charge priority table and of the discharge priority table or during a switching from a charge selection list to a discharge selection list or, conversely, during a change of a transition of the battery between the charge and discharge mode, a sorting list, called charge specific sorting list, which comprises the elements to be sorted when at least one of the priority tables is updated or to be re-sorted after an alternation with the charge operating mode.

Master control circuit BMS may update the sorting list or the sorting lists at each update of the charge or discharge priority table.

As described hereafter, a sorting operation is implemented to correctly place the elements present in the sorting list or the sorting lists. When an element is sorted, this element may be removed from the sorting list if the priority levels are not modified and if there has been no alternation between a charge operation and a discharge operation. A convergence towards a steady state where all elements are sorted as long as the priority levels and the operating mode (charge or discharge) do not change is obtained.

Figure 1:
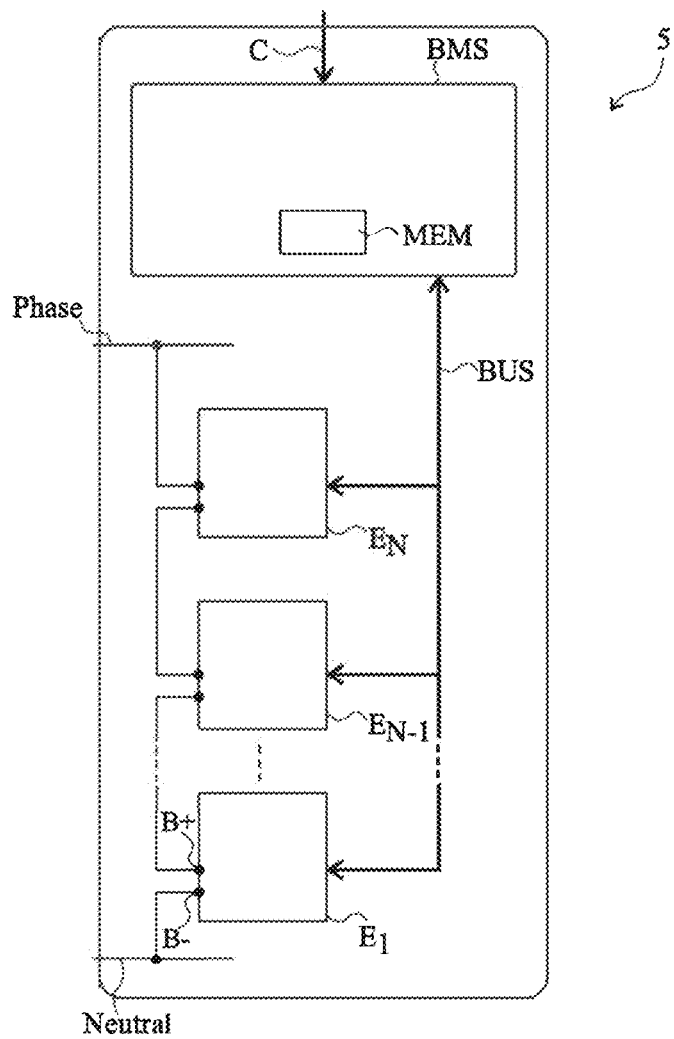
FIG. 1, previously described, partially and schematically shows an example of a cell battery.
Figure 5:
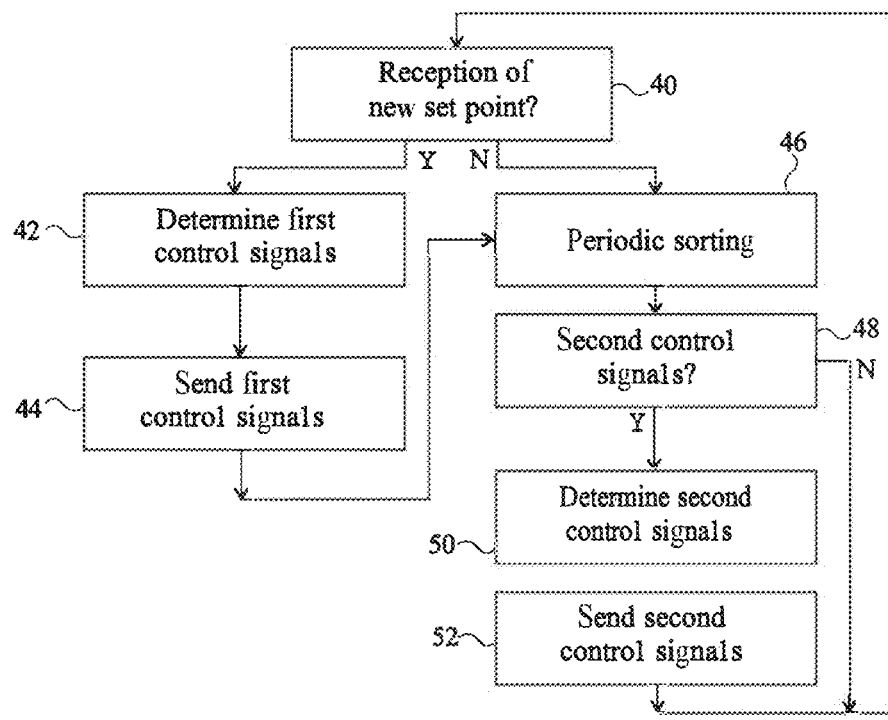
FIG. 5 is a block diagram illustrating a method of connection/disconnection of the cells of the battery shown in FIG. 1.

FIG. 5 is a block diagram illustrating a method of cell connection/disconnection control capable of being implemented by the battery 5 shown in FIG. 1.

At step 40, master control circuit BMS determines whether a new set point C has been received. If a new set point C has been received, the method carries on at step 42.

At step 42, control circuit BMS determines first control signals to follow the new set point C.

According to an embodiment where the previously-described charge or discharge list of valid cells is used, master control circuit BMS may use the previously-described position pointer which designates the last connected element. When the new set point C causes the connection of an additional cell of battery 5, master control circuit BMS selects the element in the charge or discharge list of valid cells which follows the last connected element and determines first control signals to connect the cell corresponding to this element, which then becomes the last connected element. This operation is repeated as many times as there are cells to be connected to follow the new set point C. When the new set point C causes the disconnection of a cell of battery 5, master control circuit BMS selects the last connected element and determines first control signals for disconnecting the cell corresponding to this element, the previous element in the list of valid cells becoming the last connected element. This operation is repeated as many times as there are cells to be disconnected to follow the new set point C.

According to an embodiment where the previously-described charge and discharge lists of connected and disconnected cells are used, when the new set point C causes the connection of an additional cell of battery 5, master control circuit BMS selects the first element in the charge or discharge list of disconnected cells and determines first control signals for the connection of the cell of battery 5 corresponding to this element. This operation is repeated as many times as there are cells to be connected to follow the new set point C. According to an embodiment, when the new set point C causes the disconnection of an additional cell of battery 5, master control circuit BMS selects the first element in the charge or discharge connected list and determines first control signals for disconnecting the cell of battery 5 corresponding to this element. This operation is repeated as many times as there are cells to be disconnected to follow the new set point C.

In the previously-described embodiments, the selection operation may advantageously be carried out robustly since it is guaranteed that the first element in the charge or discharge disconnected or connected list is always available to be selected or that the element designated by a pointer or the element following the element designated by a pointer is always available to be selected. Further, the selection operation may be carried out within a limited time period since there is not step of search for elements to be connected or disconnected, the selected elements being automatically determined.

According to an embodiment, at the selection step, a selection list sorting operation is not carried out. In this case, when the previously-described list of charge (or discharge) valid cells is used, when master control circuit BMS selects the last connected element in the list of charge (or discharge) valid cells to disconnect the corresponding cell, it only modifies the position pointer which designates the last connected element. Similarly, when master control circuit BMS selects the element following the last connected element in the list of charge (or discharge) valid cells to connect the corresponding cell, it only modifies the position pointer which now designates this element. When the previously-described lists of charge (or discharge) connected and disconnected cells are used, when master control circuit BMS selects the first element in the charge or discharge disconnected list, it places it in the first position of the charge (or discharge) connected list and accordingly modifies the pointers of the concerned elements, and when master control circuit BMS selects the first element in the charge (or discharge) connected list, it places it in the first position of the charge (or discharge) disconnected list and accordingly modifies the pointers of the concerned elements.

According to an embodiment, when the battery is in charge mode and at least one usable cell is connected or disconnected, master control circuit BMS modifies the list of valid cells for a charge operation (or the list of connected cells for a charge operation and the list of disconnected cells for a charge operation) but also the list of valid cells for a discharge operation (or the list of connected cells for a discharge operation and the list of disconnected cells for a discharge operation). Similarly, when the battery is in discharge mode and at least one usable cell is connected or disconnected, the master control circuit modifies the list of valid cells for a discharge operation (or the list of connected cells for a discharge operation and the list of disconnected cells for a discharge operation) but also the list of valid cells for a charge operation (or the list of connected cells for a charge operation and the list of disconnected cells for a charge operation). However, when the battery is in charge mode and at least one cell is placed in a temporary quarantine list due to a temperature/voltage cause for a charge operation, master control circuit BMS cannot place the cell in a temporary quarantine list due to a temperature/voltage cause for a discharge operation. Indeed, a cell may be placed in the temporary quarantine list due to a temperature/voltage cause for a charge operation because its state of charge exceeds a threshold while it is desirable for the cell to remain immediately available when it is passed to the discharge mode. Similarly, when the battery is in discharge mode and at least one cell is placed in a temporary quarantine list due to a temperature/voltage cause for a discharge operation, it is possible for master control circuit BMS not to place the cell in a temporary quarantine list due to a temperature/voltage cause for a charge operation. Indeed, a cell may be placed in the temporary quarantine list due to a temperature/voltage cause for a discharge operation because its state of charge falls below a threshold while it is desirable for the cell to remain immediately available when it is passed to the charge mode.

According to an embodiment, at the selection step, an operation of sorting of the selected elements of the selection lists is further carried out, particularly to take into account a possible update of the priority table. A constraint is that the sorting operation should be compatible with the result of the execution of the step of selection with no sorting operation. An example of a compatibility constraint is that if the execution of the step of selection with no sorting operation causes the disconnection of the last connected cell in the charge (or discharge) list of valid cells, the sorting operation should cause the displacement of the last connected cell into the portion of the charge (or discharge) list of valid cells gathering the disconnected cells. Another example of a compatibility constraint is that if the execution of the step of selection with no sorting operation causes the removal of the selected element from the charge (or discharge) list of connected cells and the insertion of the selected element at the head of the charge (or discharge) list of disconnected cells, the sorting operation should cause the displacement of the selected element of the charge (or discharge) list of connected cells to the charge (or discharge) list of disconnected cells at a position other than the first position. According to an embodiment, when the battery is in charge mode, the sorting operation at the selection step is carried out in the charge selection lists only and when the battery is in discharge mode, the sorting operation at the selection step is carried out in the discharge selection lists only. The sorting operation may be carried out according to different embodiments corresponding to a more or less partial sorting of the selected element.

According to an embodiment, the sorting operation corresponds to a partial sorting of the selected element, which comprises displacing the selected element at closest to the element designated by the future previous priority pointer or by the future next priority pointer if this is compatible with the result of the execution of the step of selection with no sorting operation. In the case where the previously-described list of connected cells and list of disconnected cells are used, the constraint of such a partial sorting is simply that the element designated by the future previous priority pointer or the element designated by the future next priority pointer should be in the selection list into which the selected element should be displaced. This advantageously enables to limit the duration of the execution of the sorting operation.

According to another embodiment, master control circuit BMS, for the selected element, compares the future previous priority pointer with the previous priority pointer and compares the future next priority pointer with the next priority pointer. This comparison is independent from the selection list to which the selected element belongs. In the case where the future previous priority pointer is equal to the previous priority pointer and where the future next priority pointer is equal to the next priority pointer, this means that the priority level of the selected element has not changed and that no operation of sorting of the selected element is to be performed. In the case where the future previous priority pointer is different from the previous priority pointer and/or in the case where the future next priority pointer is different from the next priority pointer, this means that a sorting of the selected element has to be performed. When there is a compatibility with the result of the execution of the step of selection with not sorting operation, the selected element is directly displaced to the location corresponding to the future previous priority pointer and to the future next priority pointer. In case of incompatibility, a partial sorting such as previously described may be implemented or the selection step may be executed with no sorting operation.

At step 44, the first control signals are transmitted by master control circuit BMS to the slave control circuits of stages $E_1$ to $E_N$ over data transmission bus BUS. The method carries on at step 46.

If, at step 40, a new set point C has not been received, the method carries on at step 46. Such an embodiment may be adapted in the case where slave control circuits 10 are capable of maintaining the signals that they supply in the absence of new orders.

As a variation, step 40 may be absent and steps 42 and 44 may be executed at each cycle. When set point C does not vary, the first control signals may however be determined at step 42 to follow the unchanged value of set point C and these first control signals are transmitted at step 44 by master control circuit BMS to the slave control circuits of stages $E_1$ to $E_N$ over data transmission bus BUS.

At step 46, master control circuit BMS performs an operation of sorting of one of the elements of the sorting list. According to an embodiment, when the battery is in charge mode, the sorting operation is performed with the charge sorting list or the common sorting list and then the specific charge sorting list and when the battery is in discharge mode, the sorting operation is performed with the discharge sorting list or the common sorting list and then the specific discharge sorting list. When the battery is in charge mode, the pointers and future pointers of the charge priority table are considered, and when the battery is in discharge mode, the pointers and future pointers of the discharge priority table are considered. According to an embodiment, master control circuit BMS determines, for the first element in the sorting list, whether the previous priority pointer is equal to the future previous priority pointer and whether the next priority pointer is equal to the future next priority pointer. If such is the case, this means that the considered element is correctly placed in the selection list where it belongs. The first element is then removed from the sorting list and the next element in the sorting list is considered. If such is not the case, this means that the considered element is not correctly placed in the selection list. The operation of sorting of the considered element may then be carried out as previously described at step 42 for the selected element. In particular, a partial sorting may be implemented. According to an embodiment, a sorting operation is carried out as follows. When the battery is in charge mode, the pointers and future pointers of the charge priority table are considered, and when the battery is in discharge mode, the pointers and future pointers of the discharge priority table are considered. When the future previous priority pointer and the previous priority pointer of the selected element are different, the selected element is displaced in the selection lists so that the previous pointer of the selected element becomes equal to the future previous priority pointer of the selected element. When the future next priority pointer and the next priority pointer of the selected element are different, the element designated by the future next priority pointer is displaced in the selection lists so that the previous priority pointer of the element designated by the future previous next pointer of the selected element designates the selected element. This advantageously enables to avoid undesirable repeated displacements of a same element between two positions.

If the considered element should not change selection list but should only be displaced in the same selection list, master control circuit BMS displaces this element, for example, by removing it from the selection list where it is located and by inserting it into this same selection list in the right place. If the considered element should change selection list, it is removed from the selection list where it is located and is inserted into another selection list in the right place.

When the displacement of an element due to a sorting operation will cause a modification in the total number of cells connected to battery 5, it is necessary to displace another element so that the total number of connected cells remains constant. The connection or the disconnection of this other element may be performed as previously described at step 42. As an example, if an element is displaced in the previously-described charge (or discharge) list of valid cells from a position corresponding to a connected cell to a position corresponding to a disconnected cell, master control circuit BMS may displace the pointer of the last connected element to the next element to cause the connection of an additional cell. According to another example, if an element is displaced from the charge (or discharge) list of connected cells to the charge (or discharge) list of disconnected cells, previously described, the first element in the charge (or discharge) list of disconnected cells may be displaced into the charge (or discharge) list of connected cells. According to an embodiment, an operation of sorting of the displaced element is further carried out. The method carries on at step 48.

At step 48, master control circuit BMS determines whether sorting step 46 requires the transmission of second connection/disconnection control signals to the slave control circuits of stages $E_1$ to $E_N$. If partial sorting step 46 does not require the transmission of second connection/disconnection control signals, the method carries on at step 40, which ends the cycle. If partial sorting step 46 requires the transmission of second connection/disconnection control signals, the method carries on at step 50.

At step 50, control circuit BMS determines second control signals to follow the sorting operation. The method carries on at step 52.

At step 52, second data are transmitted by master control circuit BMS to the slave control circuits of stages $E_1$ to $E_N$ over data transmission bus BUS. The method carries on at step 40, which ends the cycle.

In the previous embodiment, a single sorting operation per cycle is performed. As a variant, steps 46 to 50 may be repeated a determined number of times per cycle.

According to an embodiment of the method of data transmission over bus BUS, a first or a second control signal transmitted by master control circuit BMS is addressed to the slave control circuit 10 of a single module $E_i$. The slave control circuit 10 of each module $E_i$ is then capable of determining whether the control signal that it receives is addressed thereto. If this is true, slave control circuit 10 controls driver circuits 12 and 14 to apply the orders of connection/disconnection requested by master control circuit BMS. As an example, the control signals are transmitted in the form of frames, each frame comprising a header containing the address of the designated module $E_i$ followed by bytes relative to the control of the switches, and possibly followed by at least one control byte. An advantage of such an embodiment is that the responsiveness of battery 5 on reception of a new set point C is optimal. Further, the switchings of the switches of modules $E_i$ are spread over time so that the generation of electromagnetic disturbances is decreased. Further, an efficient frame error control may be implemented.

According to another embodiment of the data transmission method, each frame transmitted by master control circuit BMS contains all the connection/disconnection orders for all the cells $C_k$ of all modules $E_i$. The slave control circuit 10 of each module $E_i$ is thus used for each frame sent by master control circuit BMS. The slave control circuit 10 of each module $E_i$ is capable of analyzing the frame by extracting the orders of connection/disconnection of the switches belonging to module $E_i$.

In the previously-described embodiment, the first control signals are transmitted at step 44 and the second control signals are transmitted at step 52. As a variant, the first and second control signals may be transmitted at step 52. In this case, master control circuit BMS may determine whether a slave control circuit 10 is driven by different control signals and may determine a single control signal for this slave control circuit 10 integrating the different control signals.

Figure 6:
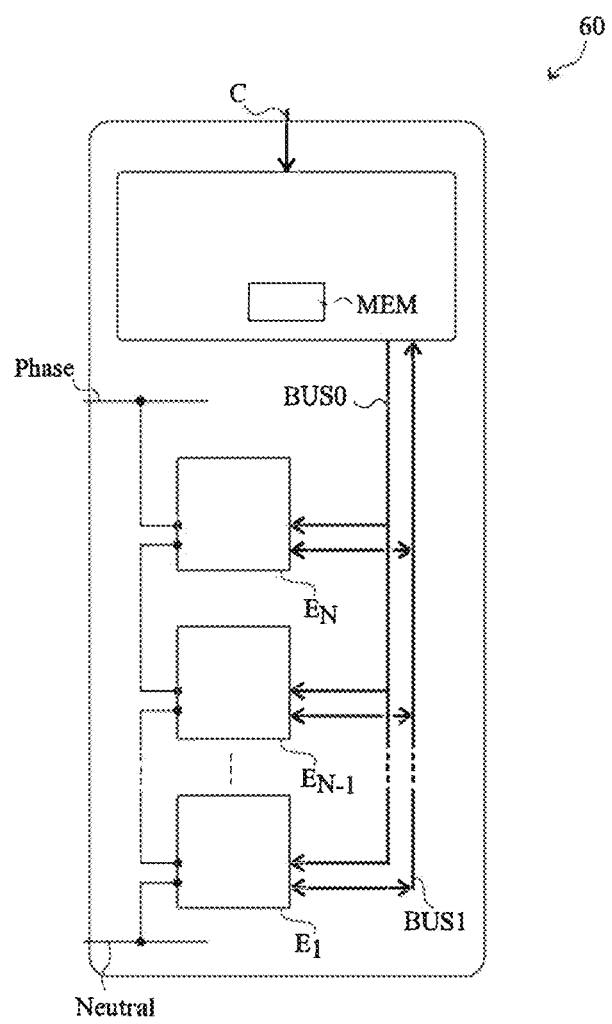
FIG. 6 partially and schematically shows another embodiment of a cell battery.

FIG. 6 shows an embodiment of a battery 60. Battery 40 comprises all the elements of battery 5 shown in FIG. 1, with the difference that data transmission bus BUS is replaced with two data transmission buses BUS0 and BUS1, which each couple master control circuit BMS to each module $E_1$ to $E_N$.

Data transmission bus BUS0 is a fast bus, that is, a bus over which data are transmitted at a rate greater than 3 megabits per second, preferably in the range from 5 megabits per second to 7 megabits per second. Data transmission bus BUS0 may be a unidirectional bus. As an example, bus BUS0 is a bus according to the RS485 standard.

Bus BUS1 is a slow bus, that is, a bus over which the data are transmitted at a rate smaller than 3 megabits per second, preferably in the range from 0.5 megabits per second to 1 megabit per second. Bus BUS1 is a bidirectional bus. As an example, bus BUS1 is a CAN data bus, particularly according to ISO standard 11898, which advantageously integrates a communication arbitration management.

Fast bus BUS0 is used for the transmission of the first and second control signals supplied by master control circuit BMS to follow set point C. Slow bus BUS1 is used for the exchange of all the other data between master control circuit BMS and each module $E_1$ to $E_N$.

According to an embodiment, the master control circuit uses two selection tables to select a cell and cells when operations of cell connection/disconnection are to be carried out, a first selection table being used during a battery charge operation and being called charge selection table hereafter and a second selection table being used during a battery discharge operation and being called discharge selection table hereafter.

In the rest of the disclosure, an embodiment will be described for a single selection table, knowing that, during a battery charge operation, the charge selection table is used and that, during a battery discharge operation, the discharge selection table is used.

According to an embodiment, master control circuit BMS transmits first control signals corresponding to orders of connection/disconnection of the cells to the slave control circuit to follow the set point and transmits second control signals corresponding to orders of connection/disconnection of the cells to the slave control circuits to follow a modification of the selection table due to the priority classification change.

According to an embodiment, the taking into account of the modifications of the priority classification is performed progressively in the selection table. At each step of update of the selection table, only a portion of the selection table is processed by master control circuit BMS. Preferably, at each step of update of the selection table, only one row of the selection table if processed by master control circuit BMS. According to an embodiment, before each step of update of the selection table, the control circuit verifies whether a new set point has been received so that the transmission of the first control signals is performed as a priority over the transmission of the second control signals.

An embodiment of a method of cell connection/disconnection capable of being implemented by the battery 5 shown in FIG. 1 will now be described in relation with FIG. 5.

At step 40, master control circuit BMS determines whether a new set point C has been received. If a new set point C has been received, the method carries on at step 42.

At step 42, control circuit BMS determines first control signals to follow the new set point. The method carries on at step 44.

At step 44, the first control signals are transmitted by master control circuit BMS to the slave control circuits of stages $E_1$ to $E_N$ over data transmission bus BUS. The method carries on at step 46.

If, at step 40, a new set point C has not been received, the method carries on at step 46.

As a variation, step 40 may be absent and steps 42 and 44 may be executed at each cycle. When set point C does not vary, the first control signals are however determined at step 42 to follow the unchanged value of set point C and the first control signals are transmitted at step 44 by master control circuit BMS to the slave control circuits of stages $E_1$ to $E_N$ over data transmission bus BUS.

At step 46, master control circuit BMS performs a partial update of the selection table as described in further detail hereafter. The method carries on at step 48.

At step 48, master control circuit BMS determines whether step 46 of update of the selection table requires the transmission of the second connection/disconnection control signals to the slave control circuits of stages $E_1$ to $E_N$. If step 46 of partial update of the selection table does not require the transmission of the second connection/disconnection control signals, the method carries on at step 40. If step 46 of partial update of the selection table requires the transmission of the second connection/disconnection control signals, the method carries on at step 50.

At step 50, control circuit BMS determines second control signals to follow the update of the selection table. The method carries on at step 52.

At step 52, second data are transmitted by master control circuit BMS to the slave control circuits of stages $E_1$ to $E_N$ over data transmission bus BUS.

According to an embodiment, each selection table is stored in memory MEM of master control circuit BMS in the form of a table, each row in the table for example corresponding to a row of memory MEM. For a battery comprising N cells, each selection table comprises N rows. In the examples of selection tables described hereafter, N is equal to 160. The selection table comprises a first column, called "Cell No." hereafter, having identifiers of the battery cells stored therein. As an example, for a battery comprising N cells, the cell identifiers range from 1 to N. Each selection table comprises a second column, called "Priority", having the cell priority levels stored therein. As an example, for a battery comprising N cells, the priority levels of the cells range from 1 to N, priority level "1" being the highest and priority level "N" being the lowest. Master control circuit BMS uses first and second pointers associated with the selection table. The first pointer is called "set point following pointer" and the second pointer is called "update pointer". These pointers each designate one of the rows of the selection table. The set point following pointer is representative of the number of cells to be connected to follow set point C. When the set point following pointer designates row P of the selection table, where P varies from 1 to N, this means that the cells corresponding to rows 1 to P of the selection table should be connected. The update pointer is representative of the progress of the update of the selection table to take into account changes of the cell priority levels. When the set point following pointer designates row Q of the selection table, where Q varies from 1 to N, this means that the update of rows 1 to Q−1 of the selection table has been performed and that the priority levels of the cells at rows 1 to Q−1 are respectively equal from 1 to Q−1.

For illustration purposes, the selection table is shown hereafter as a table where the first two columns correspond to columns "Cell No." and "Priority" of the selection table. For illustration purposes, a third column called "Connection" where, for each row of the selection table, symbol "o" indicates that the cell of the row is to be connected and symbol "n" indicates that the cell of the row is to be disconnected, has been added to the table. A fourth column, called "Set point following pointer", where a cross "x" indicates the row of the selection table designated by the set point following pointer, has further been added to the table. A fifth column, called "Update pointer" where a cross "x" indicates the row of the selection table designated by the update pointer has further been added to the table. A sixth column called "Connection order" where the numbers of the rows of the selection table, which vary from 1 to N, as indicated, has further been added to the table. When a complete update of the selection table is performed, columns "Priority" and "Connection order" are identical.

An embodiment of a method of use of the selection table during the implementation of the method previously described in relation with FIG. 5 will now be described in the case of a reception of a new set point C by master control circuit BMS.

As an example, it is assumed that, before the reception of new set point C, the (charge or discharge) selection table may be represented by the following table I:

TABLE I

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |
| ... | ... | n | | | ... |
| 156 | 4 | n | | | 8 |
| ... | ... | n | | | ... |
| 5 | 5 | n | | | 5 |
| 4 | 0 | o | x | | 4 |
| 3 | 2 | o | | | 3 |
| 159 | 3 | o | | | 2 |
| 1 | 8 | o | | x | 1 |

In table I, the set point following pointer designates row 4 of the selection table, which means that the cells designated by the rows numbered from 1 to 4 of the selection table are connected, and the update pointer designates row no. 1 of the selection table, which means that an update of the selection table should be performed for the rows numbered from 1 to N.

As an example, at step 40, the master control circuit receives a set point for the connection of an additional cell. At step 42, master control circuit BMS displaces the set point following pointer by one rank to designate row no. 5, as shown in table II hereafter. Master control circuit BMS then determines first control signals to connect cell no. 5, which are sent to the slave control circuits at step 44.

TABLE II

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |
| ... | ... | n | | | ... |
| 156 | 4 | n | | | 8 |
| ... | ... | n | | | ... |
| 5 | 5 | n | x | | 5 |
| 4 | 0 | o | | | 4 |
| 3 | 2 | o | | | 3 |
| 159 | 3 | o | | | 2 |
| 1 | 8 | o | | x | 1 |

At step 46, master control circuit BMS determines that the priority level of the cell designated by the update pointer is equal to 8 while its connection order is equal to 1. Master control circuit BMS displaces this cell to the connection order no. 8 corresponding to its priority level and displaces the cell which was at connection order no. 8 to connection order no. 1. This amounts to exchanging in the selection table rows no. 1 and no. 8, which results in table III hereafter.

TABLE III

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |
| ... | ... | n | | | ... |
| 1 | 8 | o | | | 8 |
| ... | ... | n | | | ... |
| 5 | 5 | o | | x | 5 |
| 4 | 0 | o | | | 4 |

TABLE III-continued

| Cell No. | Priority | Connection | Set point following pointer | Update pointer | Connection order |
|---|---|---|---|---|---|
| 3 | 2 | o | | | 3 |
| 159 | 3 | o | | | 2 |
| 156 | 4 | n | | x | 1 |

The performed permutation has introduced a connection "hole" for the set point following pointer. There should be no connected cells in the rows of the selection table having a higher rank than the row designated by the set point following pointer and there should be no unconnected cells in the rows of the selection table having a lower rank than the row designated by the set point following pointer. Master control circuit BMS then determines at step 50 second control signals to connect cell no. 156 and disconnect cell no. 1, which results in table IV hereafter. The second control signals are sent to the slave control circuits at step 52 and the method carries on at step 40.

TABLE IV

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |
| ... | ... | n | | | ... |
| 1 | 8 | n | | | 8 |
| ... | ... | n | | | ... |
| 5 | 5 | o | x | | 5 |
| 4 | 0 | o | | | 4 |
| 3 | 2 | o | | | 3 |
| 159 | 3 | o | | | 2 |
| 156 | 4 | o | | x | 1 |

Advantageously, master control circuit BMS processes a set point before updating the selection table. Thereby, an update is performed with the most up-to-date state of the system.

To simplify the selection table update explanations, it can be imagined that the set point no longer changes, and thus no longer causes variations of the set point following pointer or of the connection states.

At the next step 46, master control circuit BMS determines that the priority level of the cell designated by the update pointer is equal to 4 while its connection order is equal to 1. Master control circuit BMS displaces this cell to the connection order no. 4 corresponding to its priority level and displaces the cell which was at connection order no. 4 to connection order no. 1. This amounts to exchanging in the selection table rows no. 1 and no. 4, which results in table V hereafter. This permutation generates no hole in the connections, both cells no. 4 and no. 156 being connected. There is no second control signal to be sent and the method returns to step 40.

TABLE V

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |

TABLE V-continued

| Cell No. | Priority | Connection | Set point following pointer | Update pointer | Connection order |
|---|---|---|---|---|---|
| ... | ... | n | | | ... |
| 1 | 8 | n | | | 8 |
| ... | ... | n | | | ... |
| 5 | 5 | o | x | | 5 |
| 156 | 4 | o | | | 4 |
| 3 | 2 | o | | | 3 |
| 159 | 3 | o | | | 2 |
| 4 | 1 | o | | x | 1 |

At the next step 46, master control circuit BMS determines that the priority level of the cell designated by the update pointer is equal to 1 and that its connection order is equal to 1. The cell is thus properly placed in the selection table. The update pointer is then incremented and designates row no. 2 of the selection table, as shown in table VI hereafter. There is no second control signal to be sent and the method returns to step 40.

TABLE VI

| Cell No. | Priority | Connection | Set point following pointer | Update pointer | Connection order |
|---|---|---|---|---|---|
| 160 | 160 | n | | | 160 |
| 158 | 159 | n | | | 159 |
| 2 | 158 | n | | | 158 |
| ... | ... | n | | | ... |
| 1 | 8 | n | | | 8 |
| ... | ... | n | | | ... |
| 5 | 5 | o | x | | 5 |
| 156 | 4 | o | | | 4 |
| 3 | 2 | o | | | 3 |
| 159 | 3 | o | | x | 2 |
| 4 | 1 | o | | | 1 |

At the next cycle, the same operations are continued, with this time an update pointer which designates row no. 2 of the selection table.

According to an embodiment, when the update of the selection table is totally performed, which corresponds to an update pointer equal to N, master control circuit BMS may displace the update pointer in the selection table, without other actions, for example, by incrementing the update pointer so that it successively designates rows 1 to N of the selection table, until an inconsistency between the connection order and the priority level of the corresponding cell is detected/

An advantage of the previously-described embodiment is the rapidity of the response of battery 5 when a modification of a set point occurs.

According to an embodiment of the method of data transmission over bus BUS, a first or a second control signal transmitted by master control circuit BMS is addressed to the slave control circuit 10 of a single module $E_i$. The slave control circuit 10 of each module $E_i$ is then capable of determining whether the control signal that it receives is addressed thereto. If this is true, slave control circuit 10 controls driver circuits 12 and 14 to apply the orders of connection/disconnection requested by master control circuit BMS. As an example, the control signals are transmitted in the form of frames, each frame comprising a header containing the address of the designated module $E_i$ followed by bytes relative to the control of the switches, and possibly followed by at least one control byte. An advantage of such an embodiment is that the responsiveness of battery 5 on reception of a new set point C is optimal. Further, the switchings of the switches of modules $E_i$ are spread over time so that the generation of electromagnetic disturbances is decreased. Further, an efficient frame error control may be implemented.

According to another embodiment of the data transmission method, each frame transmitted by master control circuit BMS contains all the connection/disconnection orders for all the cells $C_k$ of all modules $E_i$. The slave control circuit 10 of each module $E_i$ is thus used for each frame sent by master control circuit BMS. The slave control circuit 10 of each module $E_i$ is capable of analyzing the frame and of extracting therefrom the orders of connection/disconnection of the switches belonging to module $E_i$.

According to another embodiment, the charge priority table and the discharge priority table may be stored at the level of each module and the slave control circuit of each module determines, based on the total number of cells to be connected and on the charge priority table during a charge operation and on the discharge priority table during a discharge operation, the cells of the module to be connected/disconnected. When the charge and/or discharge priority table is modified, the master control circuit may transmit to the slave control circuits second data representative of the update of the charge and/or discharge priority table.

Master control circuit BMS is capable of determining the charge and discharge cell priority table. According to an embodiment, each charge or discharge priority table is stored in memory MEM of master control circuit BMS in the form of a table, each row of the corresponding table for example corresponding to a row of memory MEM. For a battery comprising N cells, each priority table comprises N rows. Each priority table may comprise a first column having identifiers of the battery cells stored therein. As an example, for a battery comprising N cells, the cell identifiers range from 1 to N. Each priority table may comprise a second column having the cell priority levels stored therein. As an example, for a battery comprising N cells, the priority levels of the cells range from 1 to N, priority level "1" being the highest and priority level "N" being the lowest.

Master control circuit BMS updates each priority table when the priority levels of the cells are modified. As an example, the priority levels of the cells may be modified by master control circuit BMS particularly based on the data measured by the cell sensors.

Each slave control circuit 10 comprises a memory for the storage of each priority table or of a portion of the priority table. According to an embodiment, master control circuit BMS sends to each slave control circuit 10 the entirety of each priority table which is stored in the memory of slave control circuit 10. According to another embodiment, control circuit BMS sends to each slave control circuit 10 the portion of each priority table relative to the cells controlled by slave control circuit 10. Each slave control circuit 10 then only keeps in memory the portion of each priority table concerning it. In the rest of the disclosure, when it is spoken of a priority table stored by a slave control circuit 10, this may mean the entire priority table or the portion of the priority table relative to the cells controlled by slave control circuit 10 according to the implemented control method. For each module, the slave control circuit 10 of module $E_i$ determines, based on the number of cells requested by master control circuit BMS and on the priority levels of the cells forming it, the cells of module $E_i$ to be connected/disconnected to follow set point C. An advantage of such an embodiment is that the responsiveness of battery 10 on reception of a new set point C is optimal.

Figure 7:
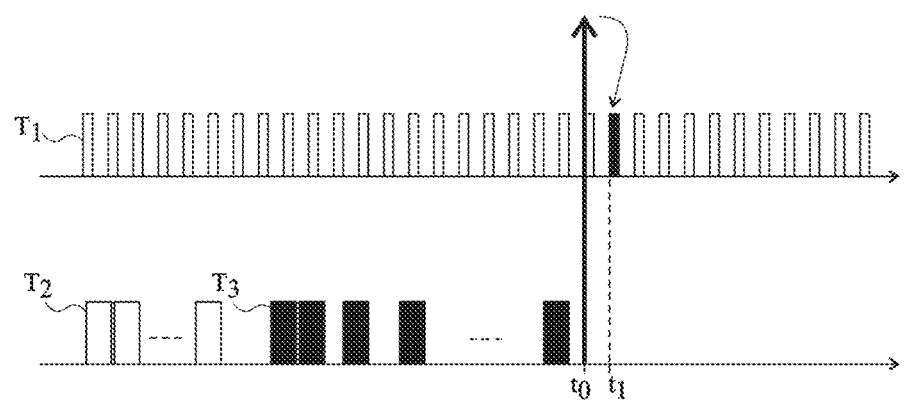
FIG. 7 is a timing diagram illustrating data exchanged between the master control circuit and the slave control circuits of the battery shown in FIG. 2 for an embodiment of a method of controlling the battery.

FIG. 7 is a timing diagram illustrating the data exchanged between master control circuit BMS and the slave control circuits 10 of the battery 60 shown in FIG. 6 for an embodiment of a method of controlling battery 60.

According to the present embodiment of the control method, the first data are transmitted by master control circuit BMS over fast bus BUS0. The first data may be representative of the total number of cells in series desired between terminals Phase and Neutral of battery 60 when modules $E_i$ have the configuration shown in FIG. 2. When the cells of each module can be placed in series and/or in parallel, the first data may be representative of the desired cell configuration. The first data may be transmitted over fast bus BUS0 in the form of frames $T_1$, for example regularly transmitted.

According to an embodiment of the data transmission method, each frame $T_1$ transmitted by master control circuit BMS is sent to all modules $E_i$, with i varying from 1 to N. The slave control circuit 10 of each module $E_i$ is thus used for each frame sent by master control circuit BMS over fast bus BUS0. The slave control circuit 10 of each module $E_i$ is capable of analyzing frame $T_1$ to extract therefrom the desired cell configuration to follow set point C, for example, the number of cells to be series-connected.

According to the present embodiment of the control method, the second data transmitted by master control circuit BMS to the slave control circuits 10 over slow bus BUS1 may be representative of the charge and/or discharge priority table or of a portion of the priority table when the latter is updated. In particular, an update of the charge and/or discharge priority table may be transmitted by master control circuit BMS to the slave control circuits 10 for each modification of the priority table determined by master control circuit BMS. FIG. 7 shows frames $T_2$ transmitted by master control circuit BMS to slave control circuits 10 over slow bus BUS1 and comprising data representative of the last version of the data table. As an example, in the case where only the portion of the priority table relative to the cells contained by module $E_i$ is transmitted to each module $E_i$, the second data may be transmitted in the form of frames $T_2$, each frame $T_2$ comprising a header containing the address of the designated module $E_i$ followed by bytes relative to the portion of the priority table relative to module $E_i$, and possibly followed by at least one control byte. The slave control circuit 10 of each module $E_i$ is then capable of determining whether the control signal that it receives is addressed thereto. According to another example, each frame $T_2$ is sent to all modules $E_i$. The slave control circuit 10 of each module $E_i$ is then used for each frame $T_2$ sent by master control circuit BMS over slow bus BUS1.

Master control circuit BMS associates a number with each version of the charge or discharge priority table. As an example, when master control circuit BMS updates the priority table, it modifies the version number associated with the new priority table. According to an embodiment, each frame $T_2$ comprising data relative to a priority table further comprises a version number of the priority table.

Each slave control circuit 10 is capable of regularly transmitting to master control circuit BMS the number of the most recent version in the priority table, which is stored in the memory. FIG. 7 represents with black frames $T_3$ the data transmitted by slave control circuits 10 to master control circuit BMS over slow bus BUS1 and comprising the numbers of the last versions of the priority tables stored by the slave control circuits.

In normal operation, in the absence of an update of the priority table, each slave control circuit 10 has stored in the memory a priority table which is used to determine the cells to be connected/disconnected. When master control circuit BMS updates the priority table, it transmits the priority table updated with the new version number to slave control circuits 10. Each slave control circuit 10 stores the new priority table while keeping in memory the previous version of the priority table. For each module $E_i$, when the slave control circuit 10 of module $E_i$ has stored the new priority table, it transmits a frame $T_3$ to master control circuit BMS, containing the number of the new version of the priority table as well as the identifier of module $E_i$. However, slave control circuit 10 keeps on processing the first data received over fast bus BUS0 with the previous version of the priority table. Slave control circuit 10 then has in memory the previous version of the priority table and the new version of the priority table.

Master control circuit BMS determines which slave control circuit 10 has received the new version of the priority table based on the received frames $T_3$. At time $t_0$, master control circuit BMS has received an acknowledgement of receipt for the new version of the priority table of each slave control circuit 10. At time $t_1$, master control circuit BMS orders the slave control circuits 10 to now use the new version of the priority table. According to an embodiment where master control circuit BMS sends a frame $T_2$ to all slave control circuits 10, master control circuit BMS may set to "1" a specific bit of frame $T_2$, which indicates to each slave control circuit 10 that the new version of the priority table should be used.

According to another embodiment, for the determination of the cell to be selected or of the cells to be selected, each slave control circuit 10 may implement the selection methods described in the previous embodiments where the selection operation is carried out by master circuit BMS. As an example, each slave control circuit 10 may implement a selection method using chained lists or a selection method using selection tables.

Figure 8:
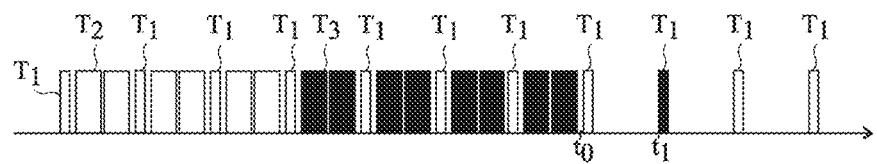
FIG. 8 is a timing diagram illustrating the data exchanged between the master control circuit and the slave control circuits of the battery shown in FIG. 1 for an embodiment of a method of controlling the battery.

FIG. 8 is a timing diagram illustrating the data exchanged between master control circuit BMS and the slave control circuits 10 of the battery 5 shown in FIG. 1 for an embodiment of a method of controlling battery 5.

In the present embodiment, the first data and the second data are transmitted over bus BUS. According to an embodiment, the frames $T_1$ relative to the first data are transmitted as a priority over the frames relative to the second data $T_2$ and over the frames $T_3$ relative to the versions of priority tables used by modules $E_i$. The rest of the method is identical to what has been previously described in relation with FIG. 7. In particular, at time $t_0$, master control circuit BMS has received an acknowledgement of receipt for the new version of the priority table of each slave control circuit 10 and, at time $t_1$, master control circuit BMS orders the slave control circuits 10 to now use the new version of the priority table.

Specific embodiments of the present invention have been described. Various alterations and modifications will occur to those skilled in the art. Although FIG. 2 shows an embodiment of arrangement of the cells and of the switches of a module $E_i$, it should be clear that the structure of each module $E_i$ may be different. In particular, the structure of each module $E_i$ may correspond to one of the structures described in patent application WO 2012/117110.

The invention claimed is:

1. A method of controlling an electric system including a first control circuit and a plurality of modules arranged in series between first and second terminals, each module in the plurality of modules comprising third and fourth terminals, at least one of the third and fourth terminals of each module in the plurality of modules being coupled to one of the third and fourth terminals of another module in the plurality of modules, each module in the plurality of modules having electric cells and switches coupling the electric cells to one another and to the third and fourth terminals of one module in the plurality of modules and one of a second control circuits, the electric system further including at least a first data transmission bus coupling the first control circuit to each one of the second control circuits, the method comprising:

determining, by the first control circuit, a first priority table associated with a charge operation of the electric system and a second priority table associated with a discharge operation of the electric system, the second priority table being different from the first priority table, the first priority table comprising a first classification of priority levels of the electric cells for the charge operation according to a first criteria and the second priority table comprising a second classification of priority levels of the electric cells for the discharge operation according to a second criteria, the first criteria and the second criteria being each chosen among a group comprising electric cell temperature, state of charge of the electric cell, and voltage across the electric cell, wherein a first order of the cell priority levels, from a highest priority to a lowest priority, of the first priority table not being an inverse of a second order of the cell priority levels of the cells, from a highest priority to a lowest priority, of the second priority table, the method further comprising successive steps of:

a) receiving a set point by the first control circuit; and
b) determining first control signals for connecting or disconnecting at least one of the electric cells of the plurality of modules to follow said set point according to the first classification during the charge operation and according to the second classification during the discharge operation, wherein the electric system includes a memory having chained lists stored therein, each chained lists having elements, each of the elements includes an identifier of one of the electric cells and at least a first pointer designating another element of the elements in one of the chained lists, a first chained list among the chained lists being associated with the charge operation of the electric system and a second chained list among the chained lists being associated with the discharge operation of the electric system, wherein step b) comprises determining the first control signals for connecting or disconnecting of one of the electric cells of the plurality of modules to follow the set point based on the first chained list during the charge operation and on the second chained list during the discharge operation, comprising determining, by the first control circuit, at least one first element among the elements of one of the chained lists, of a new value of a second pointer designating a second element in the chained list or a third element in another chained list of the chained lists, and wherein step b) comprises the successive steps of:

c) determining whether the first and second pointers of said element are different; and
d) if the first and second pointers are different, replacing the first pointer with the second pointer and determining second control signals for connecting or disconnecting a electric cell corresponding to the identifier of the first element, and wherein step d) comprises, connecting the electric cell corresponding to a first identifier of the first element, transmitting the second control signals to disconnect the electric cell corresponding to a second identifier of a fifth element and disconnecting the electric cell corresponding to the first identifier of the first element, transmitting the second control signals to connect the electric cell corresponding to the second identifier of a fifth element.

2. The control method according to claim 1, wherein the set point is selected from a group comprising a set point for the delivery of a voltage between the first and second terminals, a set point for the delivery of a current at the first terminal, or a set point for a number of electric cells.

3. The method according to claim 1, wherein the first control circuit includes a memory having, for each one of the electric cells, an identifier for each electric cell of the electric cells, a first priority level for connecting one of the electric cells among the priority levels for the charge operation, and a second priority level for connecting one of the electric cells among the priority levels for the discharge operation stored therein, wherein step b) comprises the successive step of:

e) transmitting, by the first control circuit to the second control circuits, the first control signals to connect or disconnect at least one of the electric cells of the plurality of modules to follow said set point; and f) transmitting, by the first control circuit to the second control circuits, second control signals to connect one of the electric cells and to disconnect another electric cell of the electric cells.

4. The method according to claim 3, wherein memory rows of the memory relative to the first priority level are arranged by increasing ranks and memory rows of the memory relative to the second priority level are arranged by increasing ranks and wherein step f) comprise the successive steps of:

g) exchanging a first memory row and a second memory row if a priority level of one of the electric cells, among the priority levels during the charge operation and among the priority levels during the discharge operation, at the first memory row is higher than a rank of the first memory row; and h) transmitting, by the first control circuit to the second control circuits, the second control signals to connect a first electric cell having a first identifier at the second memory row before exchanging and to disconnect a second electric cell having a second identifier at the first memory row before exchanging wherein the first electric cell having the first identifier at the second memory row before the exchange is disconnected and the second electric cell having the second identifier at the first memory row before the exchange is connected.

5. The method according to claim 3, wherein the first control circuit uses a first pointer designating a third memory row in the memory and wherein, at step a), the first control circuit modifies the first pointer to designate a fourth memory row in the memory, a number of rows between the third memory row and the fourth memory row, counting the fourth memory row, being equal to a number of cells to be connected or to be disconnected to follow the set point.

6. The method according to claim 3, wherein the first control circuit uses a second pointer designating a fifth memory row in the memory and wherein the first control circuit modifies the second pointer to designate a sixth memory row in the memory adjacent to the fifth memory row when a priority level of one of the electric cell at the fifth memory row is equal to a rank of the fifth memory row.

7. The method according to claim 1, comprising transmitting, by the first control circuit to the second control circuits, first data representative of an electric cell configuration to be obtained to follow the set point for delivering a voltage and/or a current between the first and second terminals, the second control circuits connecting or disconnecting the electric cells based on said first data and on the first classification of the priority levels of the electric cells for the charge operation or on the second classification of the priority levels of the electric cells for the discharge operation, wherein the method further comprises:

i) determining, by the first control circuit, a new version of the first classification and/or second classification;

j) transmitting, by the first control circuit to each second control circuits, second data representative of at least a portion of the new version of the first classification and/or second classification;

k) transmitting, by each second control circuits to the first control circuit, third data indicating that the second control circuit receiving at least a portion of the new version of the first classification and/or second classification; and l) Transmitting, by the first control circuit to the second control circuits, an order to use the new version of the first classification and/or second classification.

8. An electric system comprising a first control circuit and a plurality of modules arranged in series between first and second terminals, each module in the plurality of modules having third and fourth terminals, at least one of the third and fourth terminals of each module in the plurality of modules being coupled to one of the third and fourth terminals of another module in the plurality of modules, each module in the plurality of modules comprising electric cells and switches coupling the electric cells to one another and to the third and fourth terminals of one module in the plurality of modules and one of a second control circuits, the electric system further having at least a first data transmission bus coupling the first control circuit to each of the second control circuits, the electric system having a memory, the first control circuit being configured to determine a first priority table associated with a charge operation of the electric system and a second priority table associated with a discharge operation of the electric system, the second priority table being different from the first priority table, the first priority table comprising a first classification of priority levels of the electric cells for the charge operation according to a first criteria and a second classification of priority levels of the electric cells for the discharge operation according to a second criteria, the first criteria and the second criteria being each chosen among a group comprising electric cell temperature, state of charge of the electric cell, and voltage across the electric cell, wherein a first order of the cell priority levels, from a highest priority to a lowest priority, of the first priority table not being an inverse of a second order of the priority levels of the cells, from a highest priority to a lowest priority, of the second priority table, the first control circuit being configured to receive a set point and the first control circuit or each of the second control circuits being configured to determine first control signals for connecting or disconnecting at least one of the electric cells of the plurality of modules to follow said set point according to the first classification during the charge operation and according to the second classification during the discharge operation, and comprising a second data transmission bus coupling the first control circuit to each of the second control circuits, wherein the first control circuit is configured to transmit first data to the second control circuits over the first data transmission bus at a first rate and is configured to transmit second data to the second control circuits over the second data transmission bus at a second rate smaller than the first rate.

* * * * *